United States Patent
Maghoul et al.

(10) Patent No.: US 8,903,792 B2
(45) Date of Patent: Dec. 2, 2014

(54) METHOD AND SYSTEM FOR INTENT QUERIES AND RESULTS

(75) Inventors: Farzin Maghoul, Hayward, CA (US); Shiv Ramamurthi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1237 days.

(21) Appl. No.: 11/838,850

(22) Filed: Aug. 14, 2007

(65) Prior Publication Data

US 2009/0049032 A1 Feb. 19, 2009

(51) Int. Cl.
*G06F 17/30* (2006.01)

(52) U.S. Cl.
CPC .................................. *G06F 17/3087* (2013.01)
USPC ......................................................... 707/706

(58) Field of Classification Search
USPC ......... 707/621, 673, 696, 706, 707–709, 711, 707/715, 726, 741–746, 753, 805, 830
See application file for complete search history.

(56) References Cited

U.S. PATENT DOCUMENTS

| | | | |
|---|---|---|---|
| 6,026,398 A * | 2/2000 | Brown et al. ........................ 1/1 |
| 6,381,603 B1 | 4/2002 | Chan et al. |
| 7,574,420 B2 * | 8/2009 | Bates et al. ........................ 1/1 |
| 2004/0030741 A1 * | 2/2004 | Wolton et al. ................. 709/202 |
| 2004/0093325 A1 * | 5/2004 | Banerjee et al. .................. 707/3 |
| 2005/0149499 A1 * | 7/2005 | Franz et al. ....................... 707/3 |
| 2006/0064411 A1 * | 3/2006 | Gross et al. ....................... 707/3 |

* cited by examiner

*Primary Examiner* — Hosain Alam
*Assistant Examiner* — Reza Hosseini
(74) *Attorney, Agent, or Firm* — Hickman Palermo Truong Becker Bingham Wong LLP

(57) ABSTRACT

A search engine compares entered search terms to an index of terms signifying a specific or local intent. If an entered term matches term in the index, then the search engine identifies and outputs information corresponding to the specific or local intent. Terms to include in the index of terms can be identified by monitoring the searching behavior of a set of users.

16 Claims, 6 Drawing Sheets

METHOD AND SYSTEM FOR INTENT QUERIES AND RESULTS

FIELD OF THE INVENTION

The present invention relates generally to the field of internet searching and more particularly to organizing search results.

BACKGROUND

Presently, there are a number of search engines which use various algorithms to return a list of results to users in response to a user entering a string of search terms. The search engine typically orders the results from most relevant to least relevant as determined by the particular algorithms used.

In order to find information reflecting a more specific intent—for example, local information, or information related to a specific topic—a user has to input one or more search terms related to that local information or to that specific topic. It is desirable for a search engine to be able to determine a user's intent with few or no additional terms because on some kinds of input devices, such as mobile phones (including smartphones) or PDAs, entering longer search term strings can be cumbersome. Moreover, certain kinds of search terms still may not be sufficiently specific, forcing the user to perform additional, time-consuming searches. For example, if a user includes a term such as "Albany," it is not clear if the user intends Albany, N.Y.; Albany, Ga., or yet a different Albany.

Reordering of search results to prioritize those results more relevant to the user's specific intent is also desirable for users of internet-capable portable devices such as mobile phones because those devices frequently have smaller screens and keyboards, making it more difficult to navigate through a list of results and more difficult to run additional searches, thus increasing the amount of time and effort needed to find a particular result.

Therefore, there exists in the art a need for an improved search engine having the ability to decipher a user's intent without the use of additional search terms.

SUMMARY OF THE INVENTION

Aspects of the present invention include associating search terms with a specific intent, and using this specific intent to determine bow to prioritize search results, without the user having to input additional terms to evidence that intent. A search engine can access one or more indices, each of which may relate to a different specific intent. Alternatively, depending on the search terms that a user enters, the search engine may access a particular index, which may itself contain terms relating to one or more specific intents, and can return results related to a particular intent. The indices of terms can be assembled by monitoring users' searching habits in a way that determines when they are searching with a specific intent and what that specific intent is. In another embodiment, the invention also may use external information, for example, GPS information, to associate a local intent with a user's search input.

DETAILED DESCRIPTION

Figure 1:
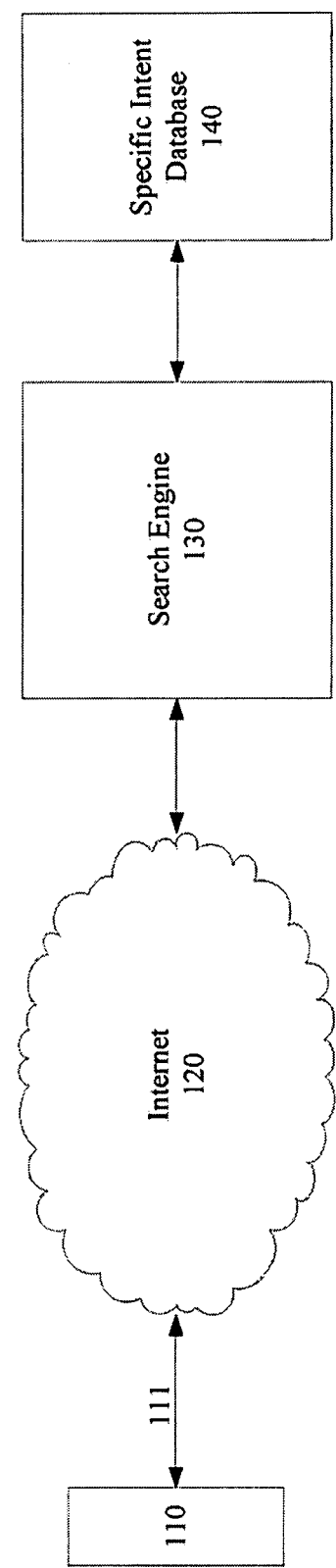
FIG. 1 shows an exemplary system implementing aspects of the present invention.
Figure 2A:
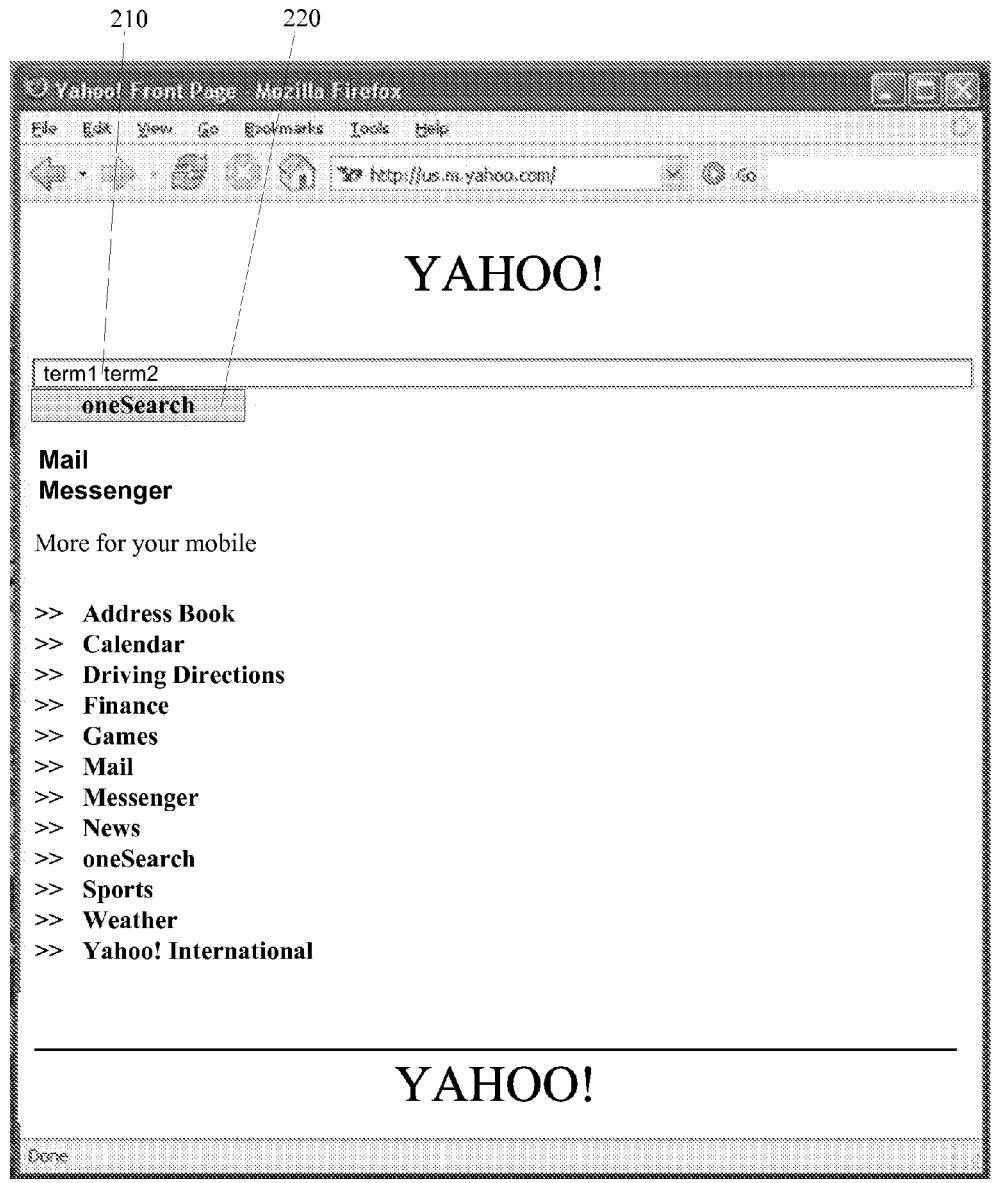
FIG. 2a shows the interface of a search engine.
Figure 2B:
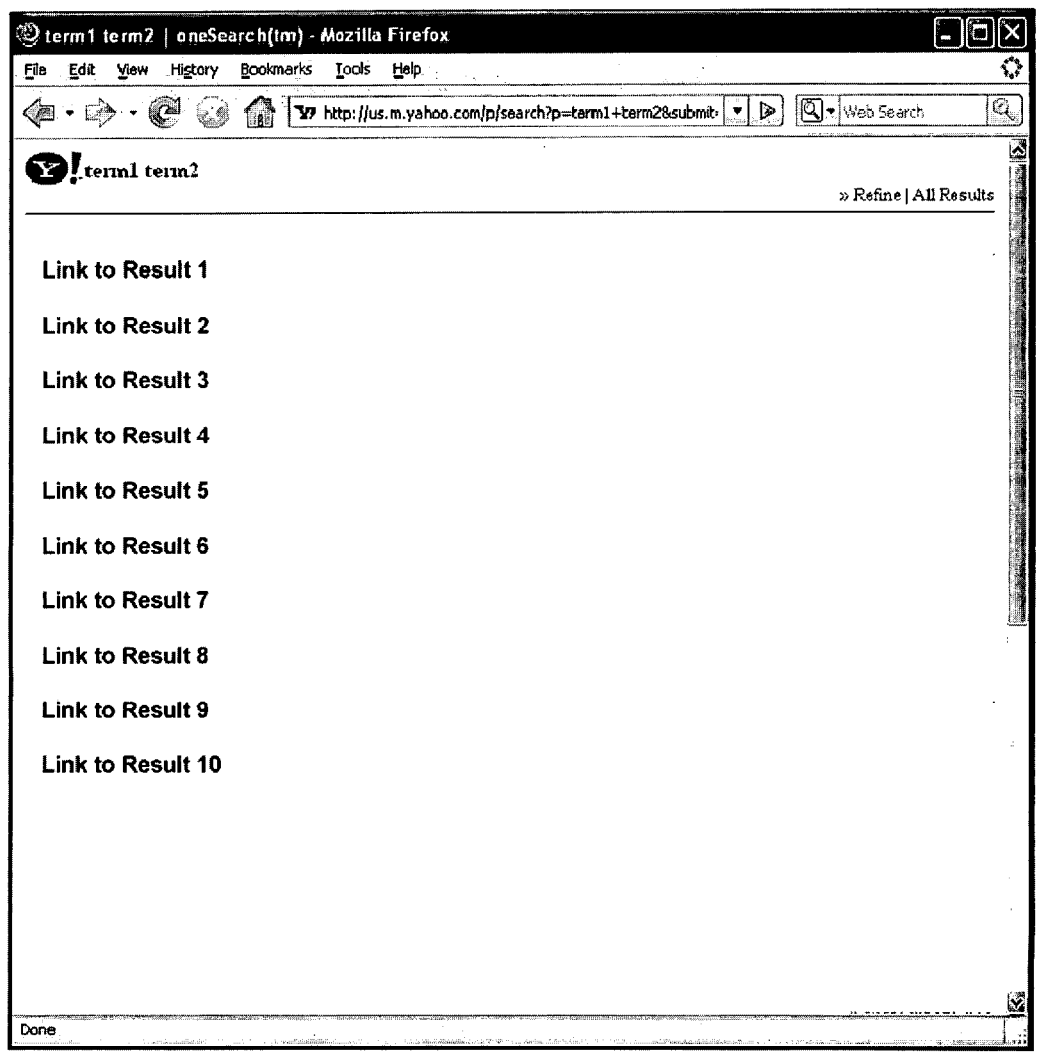
FIG. 2b shows a listing of results of a search engine.

FIG. 1 shows an illustration of a system embodying aspects of the present invention. Block 110 represents a browsing device such as a personal computer or mobile phone. Through an internet connection 111 such as a local area network or a cell phone network, the browsing device 110 can access a search engine 130 over the internet 120, such as Yahoo! Search or Yahoo!'s mobile search engine, oneSearch (http://www.m.yahoo.com). FIG. 2a shows the interface 200 to Yahoo! oneSearch being accessed with a Mozilla Firefox internet browser. A user of the browsing device 110 can enter search terms into a query field 210 on the search engine interface 200, and upon clicking a button 220 on the interface 200, the search engine 130 can access a database and generate a list of results. An example of such a list of results is shown in FIG. 2b. The results as well as the order in which the results are presented can be determined by one of the many algorithms already known to one of ordinary skill in the art.

Aspects of the present invention also include comparing the search terms entered into the search interface 200 to one or more indices of pre-generated terms accessible by the search engine 130. The pre-generated terms can be associated with specific intents such as a local intent, a map intent, a sports intent, or a news intent. A specific intent can refer generally to a type of result that a user seeks, such as links to local establishments, links to maps, links to news articles, or links to sports articles.

If a term entered into the search engine 130 matches a term in one of the specific intent indices, then the search engine may refine its search or retrieve additional results based on additional user information associated with the specific intent. For example, if a user enters a search term such as "pizza" and the search engine determines that "pizza" signifies a local intent, then the search engine may attempt to determine a location for the user. The location of the user might be determined by having the user enter a default location, accessing a user's registration information, or in the case of a portable device, determining the device's GPS coordinates or the location of the communications towers the device is using. Based on the entered search terms and the additional location information, the search engine can refine the list of results to include more results specific to the user's location.

Additionally, the search engine 130 might maintain a separate database 140 of listings associated with various specific intents. For examples, if a user enters "restaurant" as a search term and the search engine 130 identifies the user's location as San Francisco, then the search engine may access a supplemental database 140 of listings that are all local establishments. Of the local intent listings in the database 140, the search engine can determine which ones represent establishments in San Francisco, and of the San Francisco establishments, which ones are relevant to the term "restaurant." The relevant, local results can then be returned to the user and displayed in an easily accessible manner, such as first in a list of results or separately from a list of non-local results.

In addition to using specific intent information to find results, the search engine can also use specific intent information when deciding how best to display results. For example, the index may associate the words "location" or "direction" with a map intent. In such an instance, when a user enters one of those search terms in conjunction with the name of a geographic area such as a city, county, or zip code, then the search engine may, for example, return a link to Yahoo! Maps at the top of a list of results or return a link to Yahoo! Maps in a prominent position separate from the list of results.

Figure 3A:
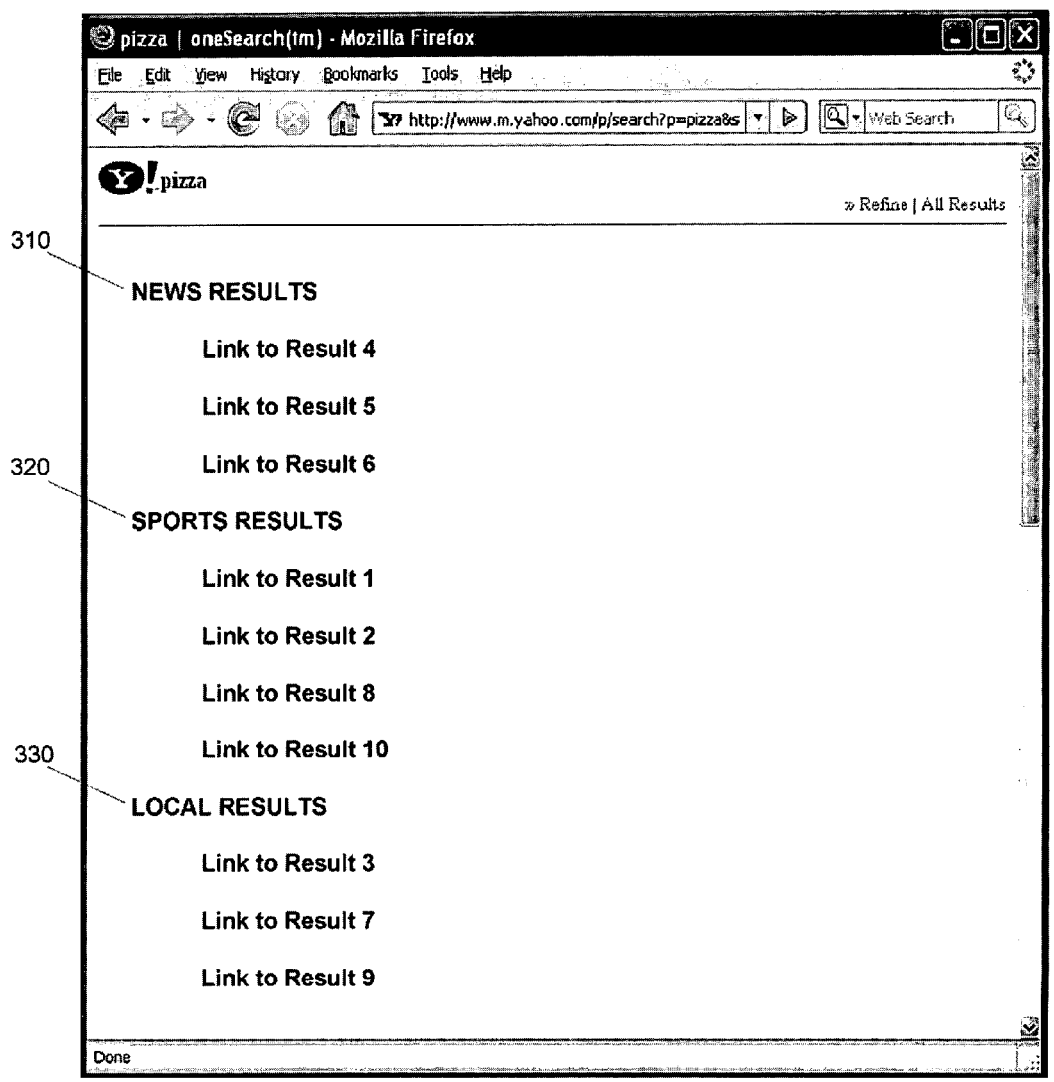
FIGS. 3a and 3b show an alternative listing of results of a search engine.

Other aspects of the present invention include changing the arrangement of categories of results based on specific intent rather than changing the arrangement of individual results. As shown in the example of FIG. 3a, rather than returning a single list of results, some search engines might return the results under different category headings, such as news 310, sports 320, local 330, etc. The search engine might have a default order in which the categories are listed. For example, news results 310 might appear at the top, followed by sports results 320 and local results 330.

Figure 3B:
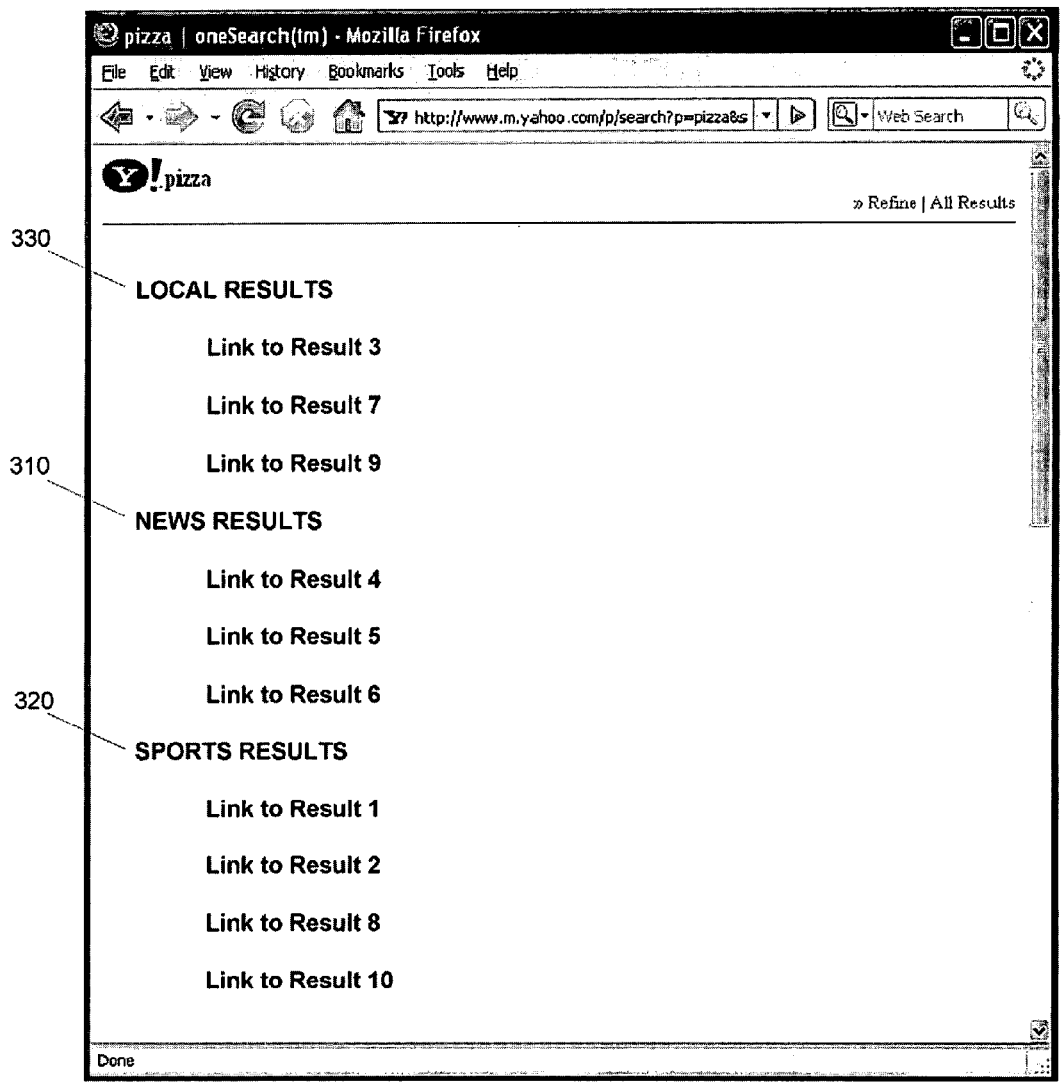

An aspect of the present invention includes arranging the categories of results based on the specific intent associated with the search term. For example, as illustrated in FIG. 3b, the index may associate a search term such as "pizza" with a local intent and consequently move the group of local listings 330 to the top of the list, as is shown in FIG. 3b. If the user enters a different term that the index identifies as having a sports intent, then the sports results 320 might be the first category of results displayed. If search terms entered are not associated with a specific intent, then the default order of category listings can be used.

Figure 4:
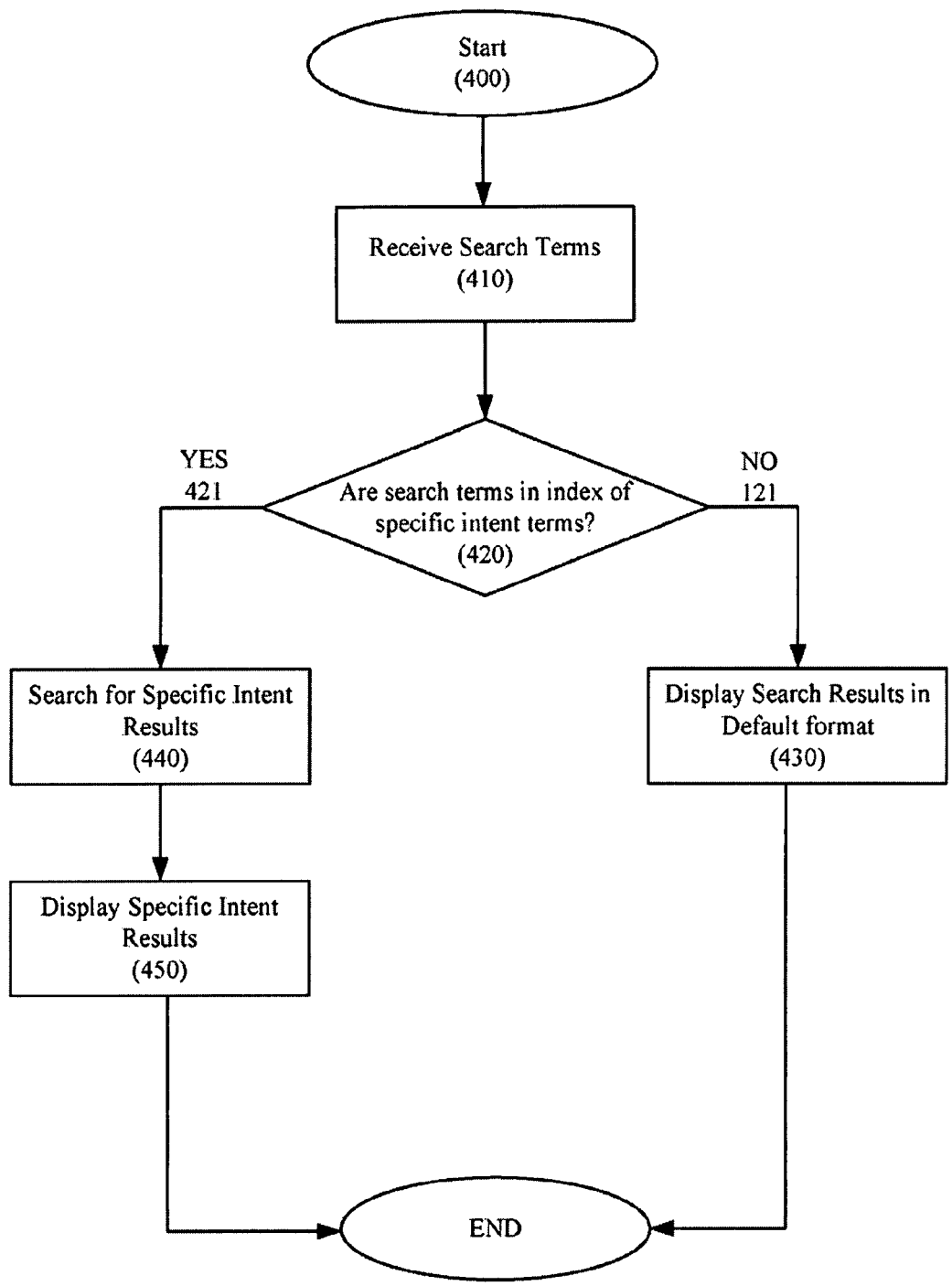
FIG. 4 shows a flowchart illustrating a method embodying aspects of the present invention.

FIG. 4 shows a flowchart illustrating a method embodying aspects of the present invention. The method can start when a user accesses a search engine such as Yahoo! oneSearch (block 400). The user can submit search terms to the search engine through the search engine's interface (block 410). The search engine can then compare the submitted search terms to an index of pre-defined terms that are known to express a specific user intent. If a search term does not appear in the index (path 422), then the search engine can process the search and display the results in a default format (block 430). If, however, the search terms appear in the index (path 421), then the search engine may access a separate, specific intent database to perform an additional search (block 440) and can display results obtained from the specific intent database in a format other than the default format (block 450).

An index of pre-generated terms can be assembled in a variety of different manners such as manually assigning certain specific intents to certain terms or determining if a term has a specific intent by tracking the behavior of users who submit searches with that term. One such method involves monitoring how users refine their searches and the links they choose to click on. For example, if a user searches on "pizza" and later refines the search by adding a local identifier such as a city name or zip code, then that might signify to the search engine that the term "pizza" should be associated with a local intent. Additionally, if a user located in San Francisco searches on the term "pizza" and only clicks on links to restaurants in San Francisco, this might further indicate that the term "pizza" signifies a local intent.

If a certain number or certain percentage of users searching on the term "pizza" exhibit behavior indicative of a local intent, then the search engine may add the term "pizza" to the index of local intent terms. Once the term is added to the index, future searches involving the term "pizza" can be treated as specific intent searches, and the results can be displayed accordingly. Methods similar to the ones used to determine if a term should be added to an index can also be used to determine if a term should be removed from an index. For example, if a user ignores local results for a particular search term, then this could indicate to the search engine that the term should not be associated with a local intent.

The index of specific intent terms can be either global or user specific. For example, in a system using global search terms, if a user in New York searches on the term "pizza," and then refines his search by adding the term Manhattan, then this will indicate to the search engine that the term "pizza" has a local intent. If a minimum threshold number of users and/or a certain percentage of users confirm that the term "pizza" indicates a specific intent, then the term can be added to a global index and can be treated as indicating a specific intent for all future searches, regardless of who is performing the search and where the search is being performed. Alternatively, the indices can be user-specific, and the intent of a specific user's search might be determined only by that user's past searching behavior.

Search engines may establish separate indices based on the type of interface a user chooses to use. For example, a search engine such as Yahoo! Search might be accessed primarily by users of personal computers whereas Yahoo! oneSearch might be accessed primarily by users of portable devices such as smartphones. Although the two search engines may share databases or other functional components, each search engine interface may be associated with a different index of terms. For example, due to the different circumstances under which they are searching, users of a mobile search engine may have a local intent when searching for the term "pizza" while users of a traditional search engine may not. Aspects of the present invention can include associating different specific intents with a term depending on the type of search engine used to perform the search (e.g. a mobile service engine versus a non-mobile search engine).

Another aspect of the present invention can include associating a specific intent with a term for only a limited set of users. When monitoring users' searching behavior to determine which terms signify a specific intent, the search engine can determine if that specific intent applies to the entire universe of users or if it applies to only a subset of users, such as users in a particular location. For example, for users located in London the term "tube" might signify a particular local intent (i.e. the London subway system, or underground), whereas for users in other locations it might not.

Another aspect of the present invention can include assigning a different scope of intent to different terms. When monitoring to determine if a term signifies a specific intent, the search engine can also monitor to determine a scope of the intent and use this scope information when determining the relevance of results and how to format results. In the case of a local intent, different search terms might indicate a desire for different levels of granularity. For example, when returning results for a term such as "restaurant," the search engine might only return local results within a limited geographic region, such as in a certain neighborhood, within a given zip code area, within a city or within a certain radius of the user, and the search engine might also arrange those local results based on proximity to the user. For a search term such as "car dealership," where proximity to the user is typically less of a concern than with restaurants, the search engine might return results within a larger geographic area, such as within the city or county or within a larger radius. A search term such as "hospital" might have a similar proximity concern to "car dealership," but broader than "restaurant, or it might have a narrower one. Additionally, the search engine might not arrange the results based on proximity but rather based on different criteria.

Another aspect of the present invention can include grouping related terms within the index of terms. For example, the term "apartment" might be grouped with terms such as "flat" and "loft." The groupings can be implemented in a multitude of ways including manual entry as well as by monitoring users' searching behavior to identify terms that are either interchangeable or closely related. When one term of the group of terms is supplied to the search engine, the search engine can use the group of terms to determine a specific intent and to return a more complete and more accurate list of results.

The grouping of terms can also be used to expand the index of terms by associating the characteristics of one term, such as a particular intent or scope of intent, with additional terms. For example, a majority of users may use the term "apartment" rather than "loft" when searching for housing, meaning the term "loft" will not reach the threshold level of use to be added to the index of terms. If, however, it can be determined that the term "loft" is used synonymously with the term "apartment," then the characteristics of the term "apartment" can be associated with the term "loft." When a user searches on the term "loft," the search engine might treat the search as having the same specific intent and same scope of intent as a search including the term "apartment."

The foregoing description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment or may be combined with features of alternate embodiments. Therefore, the present invention is not intended to be limited to the embodiments described herein but is to be accorded the widest scope defined only by the claims below and equivalents thereof.

What is claimed is:

1. A computer-implemented method comprising:
   identifying terms to be included in an index of terms associated with only a single specific intent by monitoring a set of users' searching behavior;
   wherein said specific intent includes an intent to find information relevant to a location;
   receiving a request to retrieve information stored on a computer system, wherein the request includes at least one search term;
   in response to receiving the request:
      comparing said at least one search term to said index of terms;
      determining whether said at least one search term matches a term in said index of terms;
      in response to determining that said at least one search term matches a term in said index of terms:
         determining a user's location, and
         identifying information relevant to said user's location; and
         outputting said information relevant to said user's location.

2. The method of claim 1, wherein said monitoring includes tracking a refinement of a prior search.

3. The method of claim 1, wherein said request is received from a user of a mobile device.

4. The method of claim 1, further comprising: determining a display format from a plurality of display formats based on whether said at least one search term matches a term in said index of terms.

5. The method of claim 1, further comprising: in response to determining that a threshold number or threshold percentage of said set of users' searching behavior indicates that a particular term signifies said specific intent, adding said particular term, not previously included in said index of terms, to said index of terms.

6. The method of claim 1, further comprising: associating characteristics of a second term with a first term within said index of terms.

7. The method of claim 6, further comprising: associating said characteristics of said second term with said first term only if said set of users' searching behavior indicates that both said first term and said second term signify said specific intent.

8. The method of claim 4, further comprising:
   in response to receiving a second request, comparing said at least one search term of said second request to said index of terms;
   determining whether said at least one search term of said second request matches a term in said index of terms;
   in response to determining that said at least one search term does not match a term in said index of terms, causing results of the second request to be displayed in a default format.

9. The method of claim 1, wherein said monitoring includes tracking a refinement of a prior search, said refinement including adding a second search term, said second search term being a location identifier.

10. The method of claim 1, wherein said user's location is determined by obtaining global positioning system coordinates of a mobile device of said user.

11. The method of claim 1, wherein:
   said term, associated with said at least one search term, is associated with distance information; and
   said distance information is used to determine results relevant to said user's location.

12. The method of claim 1, wherein said index of terms expressing said specific intent is associated with a unique location.

13. A computer-implemented method comprising:
   storing a plurality of indexes of terms, wherein each index of terms of the plurality is associated with a single specific intent that is different than the specific intent associated with each other index of terms of the plurality of indexes of terms;
   identifying terms to be included in each index of terms of the plurality of indexes of terms by monitoring a set of users' searching behavior;
   receiving a request to retrieve information stored on a computer system, wherein the request includes at least one search term;
   in response to receiving the request:
      determining, from among a plurality of different types of devices, a particular type of device that sent the request;
      if the particular type of device is of a first type, then comparing said at least one search term to a first index of terms of the plurality of indexes of terms;
      if the particular type of device is of a second type that is different than the first type, then comparing said at least one search term to a second index of terms of the plurality of indexes of terms;
      wherein the first index includes a term that is not included in the second index;
      in response to determining that said at least one search term matches a term in the first index of terms, identifying information corresponding to the specific intent associated with the first index of terms; and
      outputting said information corresponding to the specific intent.

14. The method of claim 1, further comprising:
in response to receiving the request, determining whether a user that submitted the request is in a particular set of users;
determining whether the at least one search term is associated with the particular set of users;
determining that the term signifies said specific intent only in response to determining that the said at least one search term matches a term in said index of terms and said user is in the particular set of users.

15. A computer system configured to perform the method recited in claim 1.

16. A computer system configured to perform the method recited in claim 13.

* * * * *